J. MAXWELL.
POWER TRACK BALLAST SHOVEL.
APPLICATION FILED JULY 24, 1920.

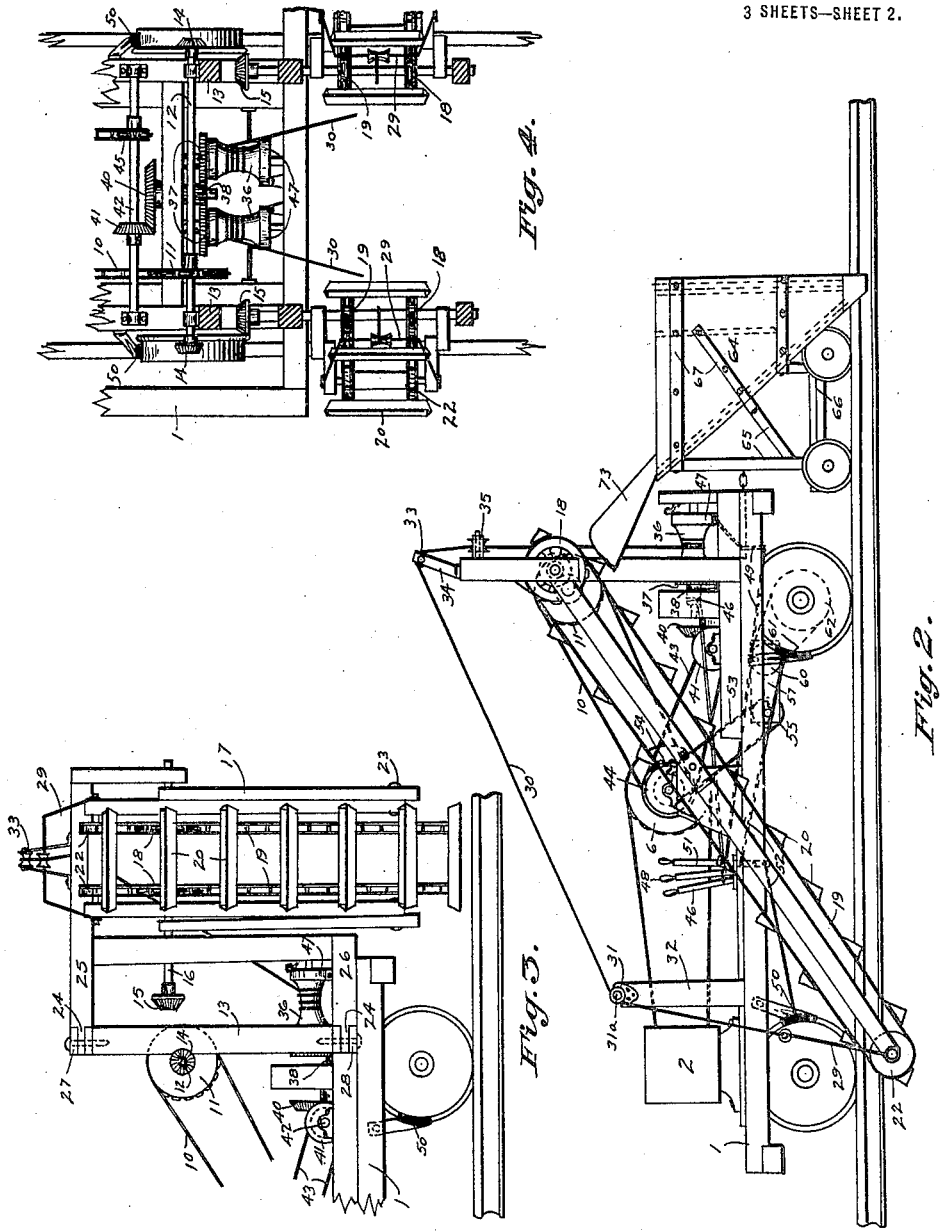

1,407,559.

Patented Feb. 21, 1922.
3 SHEETS—SHEET 3.

INVENTOR
J. Maxwell
BY E.J. Fetherstonhaugh
ATTORNEY

UNITED STATES PATENT OFFICE.

JOHN MAXWELL, OF CAMROSE, ALBERTA, CANADA.

POWER TRACK-BALLAST SHOVEL.

1,407,559. Specification of Letters Patent. Patented Feb. 21, 1922.

Application filed July 24, 1920. Serial No. 398,789.

*To all whom it may concern:*

Be it known that I, JOHN MAXWELL, foreman, a subject of the King of Great Britain, and residing at the town of Camrose, in the Province of Alberta, in the Dominion of Canada, have invented a new and useful Improvement in Power Track-Ballast Shovels, of which the following is the specification.

My invention relates to improvements in "power track ballast shovels" and consists of a series of buckets on endless chain belts set in a frame, and operated by a series of shafts and gears set up on a car which runs upon a rail track and having its own motive power.

A motor or other suitable power is placed at the front end of the car and drives a counter shaft situated about the middle of the car. From this counter shaft runs a chain belt to a sprocket wheel on a driven shaft set further back and at a slightly higher elevation. The driven shaft has on either end a bevelled gear which engage with other bevelled gears and operate a series of buckets on either side of car.

The buckets are attached to two endless chain belts which pass over sprocket wheels at either end of a frame. These frames can be folded in two and swung to rear of the car when not in use or required to pass some point where there is not sufficient clearance. A cable is attached to the bottom of each bucket frame for the purpose of raising, lowering or folding the frame, and pass is over a series of pulleys to drums placed at the rear of the car, which are operated by a system of gears, said gears being operated from a driven shaft placed near the end of the drums, the driven shaft being connected direct to the counter shaft.

A driven shaft situated under the car frame, is operated from the counter shaft by a chain belt engaging a fixed sprocket wheel on the counter shaft and a loose sprocket wheel on the driven shaft, which it operated by a clutch. A box gear is attached to the driven shaft, having forward, reverse and neutral positions for the propulsion of the car, and operates the rear axle of the car by an endless chain belt connecting a sprocket wheel attached to the box gear and a sprocket wheel on the rear axle.

A system of clutches and levers at the front end of the car operates the different shafts and gears.

The car is fitted with brakes attached to both front and rear wheels and are operated by levers situated near the front of the car.

Attached to the rear of the car is a hopper car, built on a frame and set up on a bogey truck which runs upon the rail track. This car is fitted with a loose back that can be raised or lowered, and is held in place by pawls operating in racks which form guides for the back. The back being movable, allows the ballast to be spread right down to the top of the ties. A second back is fixed inside the car a few inches from the loose back and extends down a distance sufficient to allow a clear space between it and the bottom for the ballast to pass. This back takes the pressure of the ballast off the loose back, allowing it free movement.

At the bottom of the hopper car, on either side, are fitted metal coverings in the form of boxes, which cover the rails and keep the ballast from overspreading.

At either side of the hopper car is a chute which comes directly under the buckets and guides the ballast into the hopper.

I attain these objects by means of the mechanism as shown in the accompanying drawings, in which:—

Fig. 2 is a side view, showing the position of all shafts, gears and drums, with their connections; the bucket frames in position for operation and hopper car attached at rear.

Fig. 3 is a side view of part of the machine showing position of bucket frames when folded and swung to rear of the machine.

Fig. 4 is a plan of part of the machine, showing position of the bucket frames when folded and swung to the rear of the machine.

Similar figures refer to similar parts throughout the various views.

Figure 1:
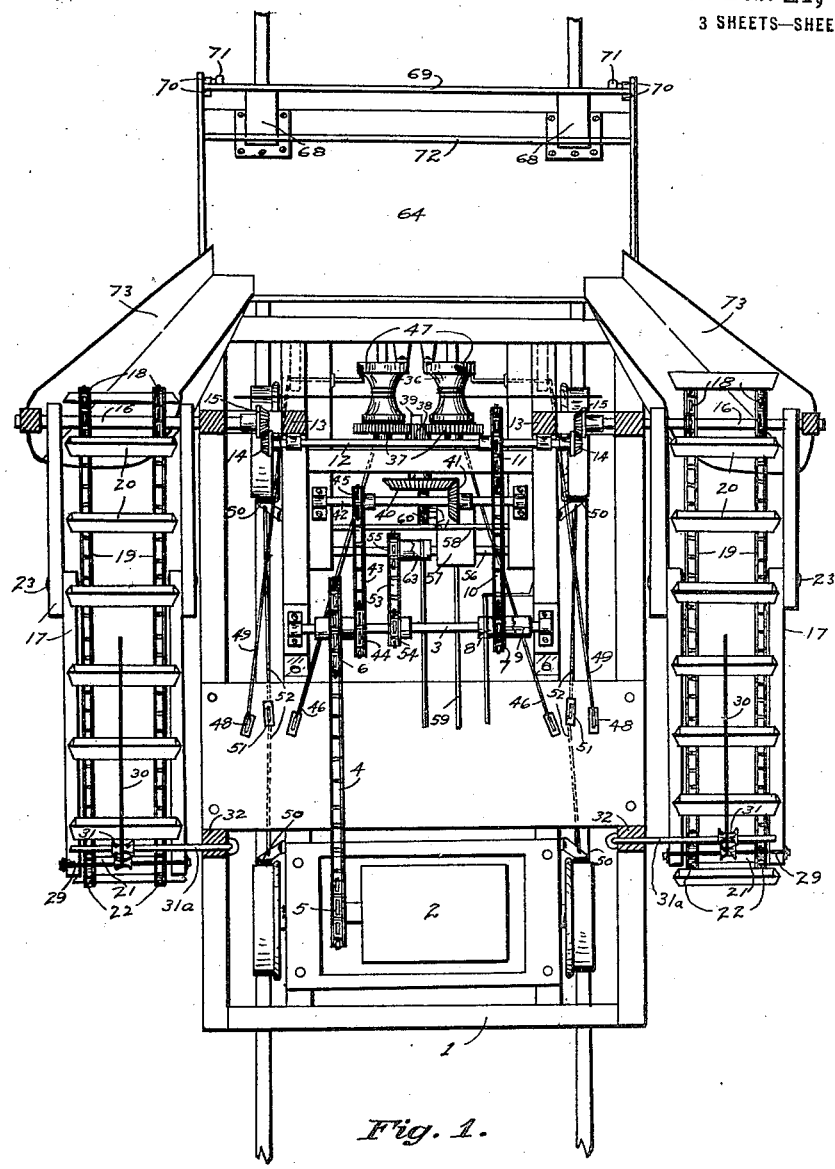
Fig. 1 is a plan, showing the arrangement of all shafts, gears and drums, with their connections; the bucket frames in position for operation and the hopper car attached at rear.
Figure 5:
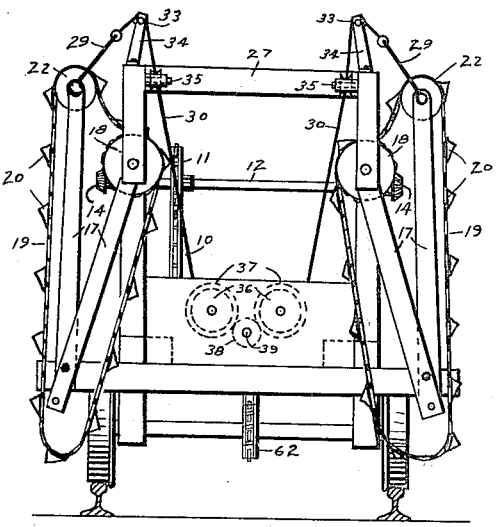
Fig. 5 is a rear view showing the method of folding bucket frames and position when swung to the rear of the machine.
Figure 6:
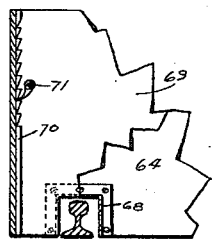
Fig. 6 is a sectional end view of part of hopper car showing the arrangement of protection box at the bottom of the car, to keep ballast from spreading over the rails.
Figure 7:
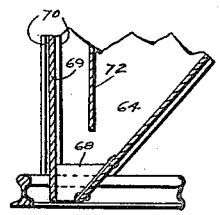
Fig. 7 is a sectional side view of part of the hopper car showing the arrangement of protection box at the bottom of the car, to keep ballast from spreading over the rails.

1 is the car on which is supported the motor, shafts, gears and drums. 2 is the motor of a suitable power for the propulsion of the car and operation of all shafts, gears, drums etc. 3 is the counter shaft which is operated by motor 2 by a chain belt 4 engaging with sprocket wheel 5 attached to the motor, and sprocket wheel 6 fixed to counter shaft 3. Attached to counter shaft 3 is a loose sprocket wheel 7 which is operated by clutch 8 which engages it with the fixed sleeve 9 attached to counter shaft 3. A chain belt 10 engages with sprocket wheel 7 on counter shaft 3 and sprocket wheel 11 fixed to a driven shaft 12. The driven shaft 12 is supported in journals attached to uprights 13 on either side of car.

At either end of driven shaft 12 are bevelled gears 14 which engage with opposite bevelled gears 15. The bevelled gears 15 are attached to shafts 16 which are supported at the top end of bucket frames 17. Attached to shafts 16 are two sprocket wheels 18 over which endless chain belts 19 pass and to which are attached the buckets 20.

At the lower end of bucket frames 17 are shafts 21 to which are attached two sprocket wheels 22 over which the endless chain belts 19 pass.

The bucket frames 17 are made in two pieces and pivoted in the centre at 23 so that they can be folded when not in use, and are also pivoted by mortice joints 24 made by the upper and lower beams 25 and 26 engaging with the upper and lower beams 27 and 28 of the frame supporting driven shaft 12.

Attached to the lower end of the bucket frames 17 are bracket rods 29 to which are attached cables 30 which pass up over pulleys 31, said pulleys being attached to rods 31ª. These rods are pivoted on stanchions 32 and when bucket frames are swung to the rear, cables 30 are disengaged from pulleys 31 and rods 31ª are swung inwards for clearance. Cables 30 pass on over pulleys 33 which are supported on brackets 34 set on top of upper beam 25 of bucket frames 17 and are guided by pulleys 35 attached to rear of beams 25 and continue on and are secured to drums 36 placed at the rear end of the car. The drums 36 have gears 37 at one end which are engaged by a pinion 38 which is attached to the end of shaft 39, said shaft being supported in a bracket attached to one of the cross beams of the car. At the further end of shaft 39 is a bevelled gear 40 which engages with bevelled gear 41 fixed to driven shaft 42 which is supported on the lower frame of the car. Shaft 42 is driven from counter shaft 3 by an endless chain belt 43 passing over sprocket wheel 44 fixed to counter shaft 3, and sprocket wheel 45 fixed to driven shaft 42.

The gears 37 are disengaged from drums 36 by clutches 46 which move the gears back free from the end of the drums. The pinion 38 is made sufficiently long so that gears 37 are always in mesh with same, even when disengaged from drums.

Attached to the drums 36 are brake bands 47 which are operated by levers 48 through connecting rods 49.

The bucket frames 17 can be raised or lowered any required distance, according to the level of the ballast, by the cables 30 operated by the drums 36, or folded in two and swung around to the rear of the car for clearance, the gears 14 and 15 being disengaged.

The car 1 is fitted with ordinary shoe brakes 50 attached to both front and rear wheels and operated by levers 51 attached to the shoes by connecting rods 52.

The car is driven by an endless chain belt 53 connecting a sprocket wheel 54 fixed to counter shaft 3, to a sprocket wheel 55 on a driven shaft 56 which is supported in bearings attached to underside of car frame. Attached to driven shaft 56 is a box gear 57 which is also supported by a cross brace 58 secured to car frame. The box gear 57 has an ordinary system of gears for moving car forward, backward or a neutral position, said gears being controlled by lever 59. A sprocket wheel 60 is attached to a shaft of the box gears and engages, by an endless chain belt 61, with sprocket wheel 62 fixed to rear axle of car. A clutch 63 is attached to driven shaft 56 to engage with sprocket wheel 55 so that same can be thrown out of action while gears are being changed.

Attached to rear of car 1 is a hopper car 64 with a sloping bottom, set up on a frame 65 supported on a bogie truck 66, and runs on the rails behind the main car.

The sides of the car are secured to the frame by iron straps 67. Attached to the bottom of the car are metal boxes 68, covering the rails, to keep ballast from falling over same. A sliding back 69 is fitted to the back of the car and can be moved up and down in the guides formed by strips 70 attached to sides of car. The outer strip is in the form of a rack which engages the pawl 71 attached to the back, allowing same to be held at any required elevation. This is for the purpose of spreading the ballast and can be lowered right down to the top of ties. A second fixed back 72 is placed a few inches from sliding back 69, to take away any pressure that would ensue by ballast pressing against sliding back. A suitable size opening is left at the lower end of the sloping bottom and the sliding back to allow the ballast to pass through.

Attached to the hopper car 64 on either side, are chutes 73, made of galvanized iron or other suitable material; the upper end of said chutes coming directly under the buckets as they pass over the top of the bucket 13ª frames, and guiding the ballast dumped from the buckets into the hopper car.

What I claim as my invention is:

1. In power shovels, a body, running gear supporting said body, an endless carrier having scoop buckets and a chute delivery and supported in an elevated position at its rear end, means for raising and lowering the carrier at its scoop end, motive power for operating said carrier and running gear and means for collapsing and swinging said carrier from the side to the end of the body.

2. In power shovels, a body, running gear supporting said body, a motor carried on said body, a counter shaft operatively connected to said motor and to said running gear, an endless scoop carrier supported in an elevated position at one end and having means for elevating and lowering the other end, and a chute delivery from the elevated end, a cable winding apparatus operatively connected to said carrier and said countershaft, means for collapsing and swinging said carrier to the rear end of said car, and a hopper car having suitable running gear and following the aforesaid vehicle under the chute delivery and formed with a discharge end and rail shields at said discharge end.

JOHN MAXWELL.